Patented July 16, 1935

2,008,157

UNITED STATES PATENT OFFICE 2,008,157

ANTHRAQUINONE-ACRIDONE DYESTUFF

William Smith, James Primrose, and John Thomas, Grangemouth, Scotland, assignors to Imperial Chemical Industries Limited, a corporation of Great Britain No Drawing. Application March 28, 1931, Serial No. 526,130. In Great Britain April 1, 1930

1 Claim. (Cl. 260—37)

This invention relates to the preparation and use of colouring matters and intermediates of the anthra-quinone series.

We have found that 3'-amino-2-benzoyl-benzoic acids have an amino, hydroxy, alkylamino, phenylamino or mercapto group in the 4'-position condense with o-halogenoanthraquinonecarboxylic acids or their derivatives, to give new products which are in general substituted anthraquinonylaminobenzoyl-benzoic acids and which will be referred to hereinafter under that term. These products are coloured and are in part useful as dyestuffs, and in part as intermediates for the production of other products, including dyestuffs.

We have further found that those of the new anthraquinonylaminobenzoyl-benzoic acids in which suitable positions ortho to the carbonyl group of the benzoyl residue are free are converted by treatment with condensing agents (e. g. sulphuric acid) into new products which are 4-substituted-1, 2, 5, 6-diphthaloyl-acridones, and which are valuable dyestuffs, especially suitable as vat dyestuffs, and also suitable as pigments.

Besides the benzoyl-benzoic acids already mentioned, we have also found that their substituted derivatives including those in which the amino, hydroxy or mercapto group carries substituents, may also be condensed with o-halogenoanthraquinonecarboxylic acids or their derivatives. The resulting anthraquinonylaminobenzoyl-benzoic acids can also be cyclized with the aid of sulphuric acid provided again that the necessary ortho positions are free. Of the two classes of new products which are obtained in general, those obtained in the first stage are soluble in alkali, which those obtained in the second are not. The latter form fast vat dyestuffs dyeing in a variety of shades. These new dyestuffs may be used for the production of dyed or printed materials.

The condensation of the amino-benzoyl-benzoic acids with o-halogenoanthraquinonecarboxylic acids may very conveniently be carried out in alkaline solution in the presence of acid absorbers, such as soda ash, and catalysts, such as copper salts; organic liquids may be used instead if desired, provided the requisite acid absorbers, for instance, organic acid absorbers such as pyridine, are used to keep the acids in solution, or provided alternatively, the acids are employed in the form of their ethyl or other esters. The resulting products of the condensation being soluble in alkali are in general easily purified.

In the subsequent treatment of the anthraquinonylaminobenzoyl-benzoic acids, other acid dehydrating or condensing agents such as aluminium chloride or acetic anhydride, can in certain cases be employed instead of sulphuric acid, but in general sulphuric acid or oleum is the most convenient and economical.

The invention is illustrated but not limited by the following examples, in which the parts are by weight.

Example 1

This example describes the production of one of the necessary starting materials for use in this invention. In this example 3'-amino-4'-phenoxy-2-benzoyl-benzoic acid is prepared from 3'-nitro-4'-chloro-2-benzoyl-benzoic acid.

32 parts of 3'-nitro-4'-chloro-2-benzoyl-benzoic acid, 9.4 parts of phenol, 8 parts of caustic soda and 0.5 parts copper powder are heated together with 150 parts of water under reflux condensation for 16 hours and then poured into 500 parts of cold water. The product is filtered and after cooling with the ice, the filtrate is acidified with dilute hydrochloric acid. The precipitate thrown out of solution is filtered and washed free from mineral acid. The product thus obtained is a colourless body.

A mixture of 35 parts of the 4'-nitro-3'-phenoxy-2-benzoyl-benzoic acid obtained above with 15 parts caustic soda, 15 parts sodium hydrosulphite and 500 parts of water are stirred at 60° C. for one hour and then air is blown in for 24 hours. The liquid is made acid and the insoluble product filtered off. The filtered paste is washed free from acid and allowed to dry slowly at such a temperature as to avoid melting the material. The product obtained has the probable formula:

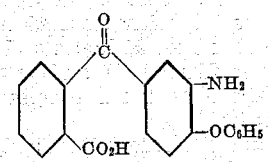

Example 2

This describes the condensation of the product from Example 1, with 1-chloroanthraquinone-2-carboxylic acid. The following mixture is heated in a salt bath at 103–105° C. for 16 hours.

16.7 parts of the product from Example 1, 14.3 parts 1-chloroanthraquinone-2-carboxylic acid, 30 parts of sodium carbonate, 2 parts of copper sulphate and 150 parts of water. The product is then filtered and after cooling with ice the filtrate is acidified and re-filtered. The body obtained is bluish-red in colour and dissolves in strong sulphuric acid with a reddish-yellow colour. It has the probable formula:

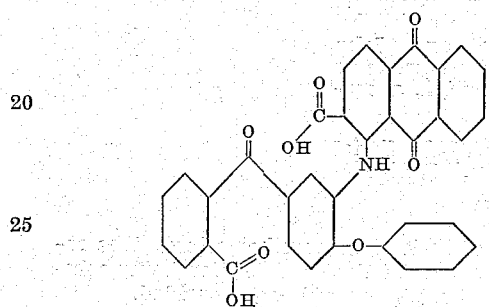

Example 3

This example describes the ring-closure of the product from Example 2.

A mixture of 10 parts of the product from Example 2 and 100 parts sulphuric acid 66° Bé., is heated rapidly to 145–150° C. and maintained at this temperature for 15 minutes. After cooling, the mass is poured into 1000 parts of cold water and filtered. The product obtained dyes cotton in reddish-brown shades from a brown vat. The colour of the strong sulphuric acid solution is dark green. The product has the probable formula:

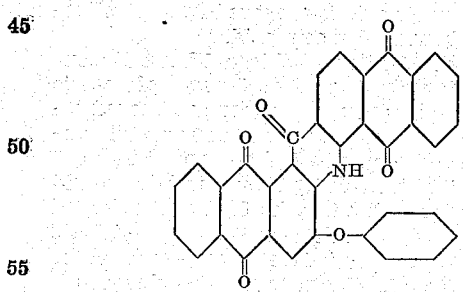

Example 4

This describes the production of another of the starting materials, namely, 3'-amino-4'-anilino-2-benzoyl-benzoic acid.

7 parts of aniline, 10 parts of 3'-nitro-4'-chloro-2-benzoyl-benzoic acid, 9.3 parts of sodium carbonate, 0.75 part copper sulphate, and 86 parts of water are heated together in a salt bath at 103–105° C. for 3 hours. The mass is then poured into 500 parts of cold water and filtered. The filtrate is cooled with ice and acidified. It is allowed to stand for 24 hours and the crystalline precipitate is filtered off and washed free from acid and dried at room temperature. It is a pale yellow body.

13 parts of the pale yellow body are taken up with 400 parts of water and sufficient ammonia solution of specific gravity 0.880 added to dissolve them. The solution is then heated to 85° C. and 60 parts of ferrous sulphate and ammonia of specific gravity 0.880 are added in alternate small quantities until reduction is complete, as shown by the formation of a black precipitate of ferrous hydroxide. The total ammonia required is about 50 parts. The mass is stirred for 15 minutes after the first appearance of the ferrous hydroxide and then filtered. On cooling, long fine yellow needles separate. These are filtered off and the filtrate is acidified, thereby throwing down a dark green precipitate. This is allowed to stand for 24 hours, filtered off, and dried. It gives a red colour with strong sulphuric acid.

Example 5

This describes the condensation of the product from Example 4 with 1-chloroanthraquinone-2-carboxylic acid.

16.7 parts of this product, 14.3 parts 1-chloroanthraquinone-2-carboxylic acid, 30 parts of soda ash and 2 parts of copper sulphate are heated together in 150 parts of water on a salt bath for 4 hours at 103–105° C. The mass is then filtered and after cooling with ice the filtrate is made acid with dilute hydrochloric acid. The bulky precipitate which is thrown down is filtered and washed acid free. It is a dark green body which gives a yellowish-red colour in strong sulphuric acid. The product has the probable formula:

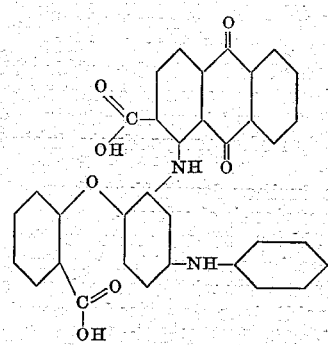

Example 6

This example describes the ring-closure of the product from Example 5 with strong sulphuric acid.

10 parts of the product from Example 5 and 100 parts of sulphuric acid 66° Bé., are heated together rapidly to 145–150° C. This temperature is maintained for 15 minutes and after cooling the mass is poured into water. The dark coloured material thrown out of solution is isolated in the usual way. It dyes cotton a bright greenish-blue shade from a brown vat. Its solution in strong sulphuric acid is yellowish-green. The product has the probable formula:

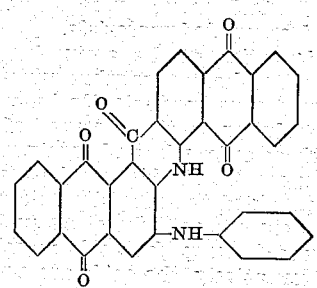

Example 7

This describes the production of a third starting material, 3'-amino-4'-methylamino-2-benzoyl-benzoic acid.

50 parts of 4'-chloro-3'-nitro-2-benzoyl-benzoic acid and 500 parts of 25 per cent methylamine solution are heated on a water-bath under reflux condensation for 15 hours. The liquid is then filtered, the filtrate cooled to 6° C. with ice and acidified with hydrochloric acid. The pale orange body thrown out of solution is isolated in the usual way.

Reduction is carried out in a samilar manner to Example 4. The product is dark green and dissolves in strong sulphuric acid with a reddish-yellow colour.

Example 8

This describes the condensation of the product from Example 7 with 1-chloroanthraquinone-2-carboxylic acid.

26 parts of this product are mixed with 28.6 parts of 1-chloroanthraquinone-2-carboxylic acid, 60 parts of sodium carbonate and 4 parts of copper sulphate in 300 parts of water. This mixture is refluxed together in a boiling salt solution bath for 6 hours. It is then filtered and the filtrates cooled and acidified. The dark bluish-green material thrown down is filtered off, washed free from acid and dried. It gives a yellowish-green colour with strong sulphuric acid. The product has the probable formula:

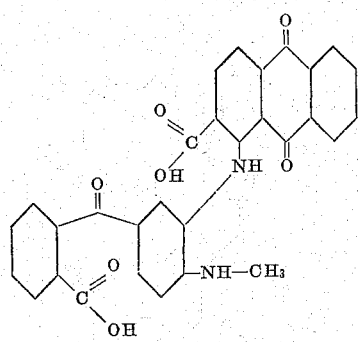

Example 9

This example describes the ring-closure of the product from Example 8 with strong sulphuric acid.

The product from Example 8 is heated with 10 times its weight of sulphuric acid 66° Bé. at 130° C. for 15 minutes. The mass is cooled and poured into water. The material separates as a dark blue precipitate which is filtered off and extracted with dilute alkali. It dyes cotton a bright blue shade from a reddish-brown vat. The colour in strong sulphuric acid is bluish-green. The product has the probable formula:

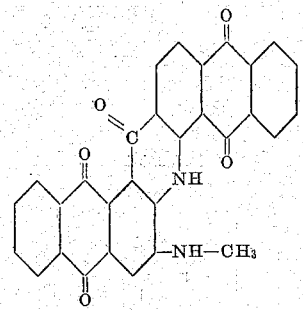

Example 10

This is an example of the condensation of 4'-chloro-3'-nitro-benzoyl-2-benzoic acid with p-phenylenediamine and reduction of the resulting product to give a further starting material.

20.4 parts 4'-chloro-3'-nitro-2-benzoyl-benzoic acid, 3.6 parts p-phenylenediamine, 20 parts of soda ash and 1 part of copper sulphate are heated together with 200 parts of water in a salt bath at 103–105° C. for 16 hours. The product is separated by pouring the mass into 1000 parts of water, filtering and acidifying the filtrate with hydrochloric acid after cooling with ice, whereby a pale greenish-yellow body is thrown out of solution which is filtered off, washed acid-free and dried.

Reduction is carried out in the same manner as Example 4. The resulting product has the probable formula:

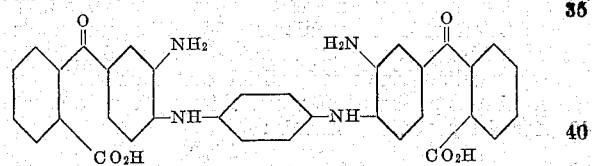

Example 11

This describes the condensation of the reduced body from Example 10 with 1-chloroanthraquinone-2-carboxylic acid.

A mixture of 33 parts of the reduced product, 28.6 parts 1-chloroanthraquinone-2-carboxylic acid, 60 parts of sodium carbonate, 4 parts of copper sulphate and 300 parts water, is heated to 103–105° C. for 16 hours. The mass is filtered and a dark green body obtained in the usual manner from the filtrate by cooling with ice and making acid with hydrochloric acid. It may be recrystallized from nitrobenzene and gives a reddish-yellow colour with strong sulphuric acid. The product has the probable formula:

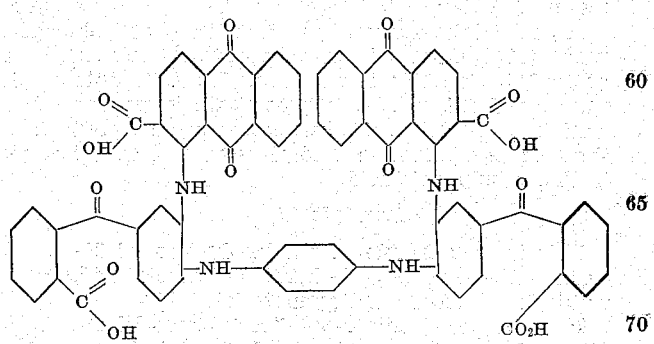

Example 12

This describes the ring-closure of the product from Example 11.

10 parts of the body are heated to 150–160° C. for 15 minutes with 100 parts of strong sulphuric acid. The product is separated in the usual manner. It dyes cotton a bluish-green shade from a reddish-black vat and dissolves in strong sulphuric acid with a greenish-yellow colour.

The product, which may be termed bis-4,4' (1,2,5,6-diphthaloyl-acridonyl)-para-phenylenediamine, has the probable formula:

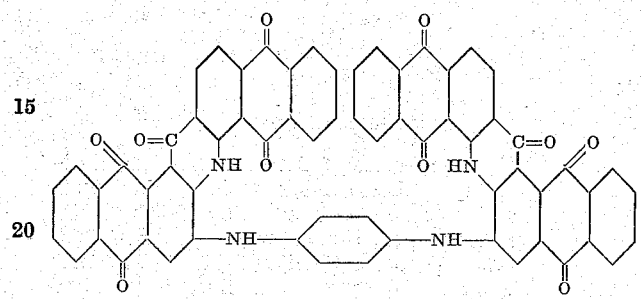

Example 13

This is an example of the condensation of 3'-amino-4'-hydroxy-2-benzoyl-benzoic acid with 1-chloroanthraquinone-2-carboxylic acid.

5 parts of 3'-amino-4'-hydroxy-2-benzoyl-benzoic acid and 517 parts of 1-chloroanthraquinone-2-carboxylic acid are heated together under reflux in a salt bath with 10 parts of sodium carbonate, 0.5 part copper sulphate crystals and 180 parts of water for 5½ hours. The mass is filtered and the filtrate is cooled and acidified with hydrochloric acid. The product is then filtered off, washed acid-free and dried. It is a reddish-black body which dissolves in strong sulphuric acid with a green colour. The product has the probable formula:

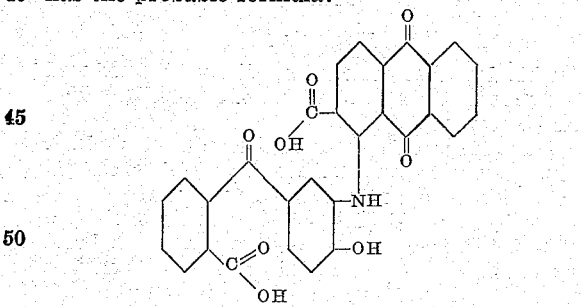

Example 14

The ring closure of the body produced in Example 13 may be accomplished in the following manner.

10 parts of the product from Example 13 and 100 parts of sulphuric acid monohydrate are heated at 170° C. for 15 minutes, cooled, poured into water, and filtered. The precipitate is washed acid-free and dried. It dyes cotton a bluish-red shade from a brown vat and gives a green colour in strong sulphuric acid.

Example 15

This is an example of the production of 3'-amino-4'-mercapto-2-benzoyl-benzoic acid, which is a further starting material.

20 parts of 4'-chloro-3'-nitro-2-benzoyl-benzoic acid and 30 parts of potassium sulphide are mixed with 320 parts of alcohol and 80 parts of water and heated under reflux condensation for 16 hours. The mass is then diluted with 1000 parts of water and air-blown at the boil for 24 hours. It is now cooled with ice and acidified. The yellow product is separated in the usual way by filtration. It dissolves in strong sulphuric acid with a reddish-yellow colour.

Example 16

This is an example of the condensation of the production from Example 15 with 1-chloroanthraquinone-2-carboxylic acid.

5.5 parts of the product from Example 15 and 5.7 parts of 1-chloroanthraquinone-2-carboxylic acid are heated under reflux in a salt bath at 103–105° C. in 150 parts of water with 10 parts of sodium carbonate and 0.5 part of copper sulphate for 16 hours. The mass is then filtered and the filtrate cooled to 0° C. and acidified. The product is filtered off, washed acid-free and dried. It dissolves with a pale yellow colour in strong sulphuric acid. The product has the probable formula:

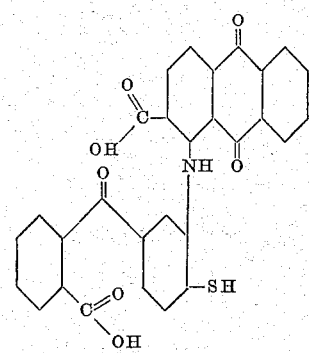

Example 17

The ring closure of the product obtained in Example 16 may be accomplished in the following manner.

10 parts of the product from Example 16 are heated to 145–150° C. with 100 parts of sulphuric acid monohydrate for 15 minutes. The mass is cooled, poured into 1000 parts of water and the product separated in the usual way. It dyes cotton a blue shade from a reddish-brown vat. The product has the probable formula:

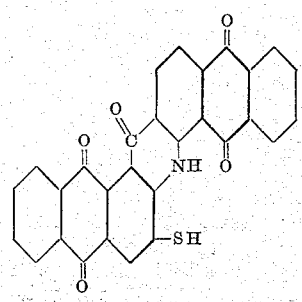

Example 18

This describes the production of 3'-amino-4'-anthraquinonyl amino-2-benzoyl-benzoic acid, which is a further starting material.

20 parts of the product described in Example 1 of copending application 7202/29 are heated in 20 parts caustic potash and 200 parts of water at 100° C. until the ester is completely hydrolyzed as shown by complete solution of the material. This solution is then diluted to about 1000 parts with water and heated to 60° C. 15 parts of sodium hydrosulphite are then added and the mixture stirred at 60–65° C. for one hour. Air is passed through the mixture for 24 hours to oxidize the excess of hydrosulphite and ice is then added to cool the solution to 0° C. Dilute hydrochloric acid is added to this cooled solution until the liquor is very slightly acid to Congo red. The precipitated material is dark blue and is separated in the usual way. It gives with strong sulphuric acid a reddish-yellow solution.

Example 19

This describes the condensation of the product from Example 18 with 1-chloroanthraquinone-2-carboxylic acid.

4.6 parts of the product from Example 18, 3 parts of 1-chloroanthraquinone-2-carboxylic acid, 7.5 parts of sodium carbonate, 0.5 part copper sulphate crystals and 150 parts of water are refluxed for 16 hours at 103–105° C. The mass is then filtered, the filtrates cooled with ice and made slightly acid with hydrochloric acid. The dark green precipitate which is thrown down is filtered off, washed acid-free and dried. The colour of this in strong sulphuric acid is yellowish-brown. The product has the probable formula:

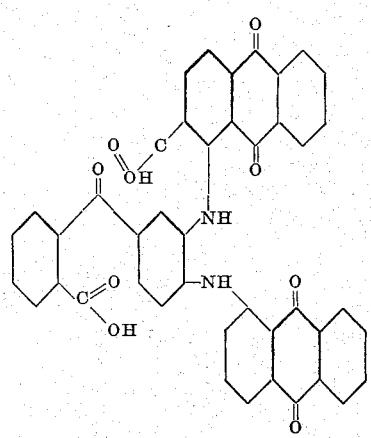

Example 20

This describes the ring-closure of the product from Example 19.

5 parts of the product from Example 19 and 50 parts of sulphuric acid 66° Bé. are heated to 145–150° C. for ¼ hour. The acid solution is then cooled and poured into 500 parts of water and the precipitated material is filtered off. Any unchanged material is removed by extraction with dilute alkali. The product dyes cotton a dark green shade from a reddish-black coloured vat. The product has the probable formula:

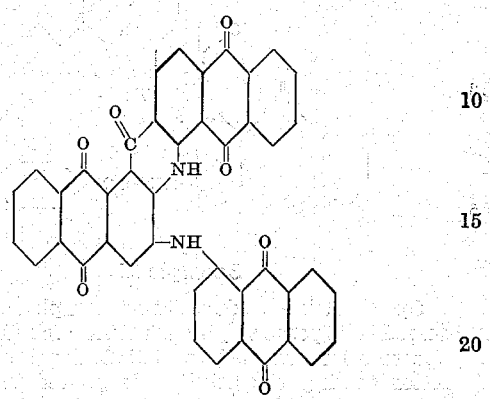

Example 21

Preparation of a further starting-material.

50 parts of 4'-amino-3-nitrobenzoyl-2-benzoic acid are dissolved in a solution made up of 17.5 parts caustic soda and 160 parts water, 36 parts of benzoyl chloride are then run into the solution with vigorous agitation. The reaction mixture is stirred for 1 hour and 50 parts of a 10% caustic soda solution run in. When the odour of the benzoyl chloride can no longer be observed the clear yellow solution is filtered and the filtrates cooled with ice and acidified with dilute hydrochloric acid. After standing overnight the granular precipitate is filtered off and dried at 50° C.

50 parts of 4'-benzoylamino-3'-nitrobenzoyl-2-benzoic acid are taken up with 1000 parts of water and sufficient ammonia to give a clear solution added. The temperature of the solution is then raised to 80° C. and 275 parts of ferric sulphate and 160 parts strong ammonia solution added in alternate small quantities. Reduction is complete when the ferrous hydroxide is no longer oxidized to ferric hydroxide and therefore remaining black. The mixture is made strongly ammoniacal and filtered at 95–100° C. Hydrochloric acid is added to the filtrates till the solution is slightly acid to Congo red paper and the small amount of tarry material precipitated filtered off. The filtrates are cooled by adding ice and sufficient sodium chloride added to make a 20% solution. After standing overnight the pale orange coloured precipitate is filtered off and dried at 50° C.

Example 22

Ring closure of the product obtained in Example 21 may be accomplished in the following manner.

10.8 parts of 3'-amino-4'-benzoylamino-benzoyl-2-benzoic acid, 8.6 parts of 1-chloroanthraquinone-2-carboxylic acid, 25 parts sodium carbonate, 1.2 parts copper sulphate and 100 parts of water are refluxed together in a salt bath for 4 hours. The brown coloured solution rapidly becomes dark red. It is filtered hot and the filtrates made acid with hydrochloric acid after cooling with ice. The dark precipitate is allowed to settle out over night, filtered off and washed free of acid with cold water. It is dride carefully at a fairly low temperature. The product has the probable formula:

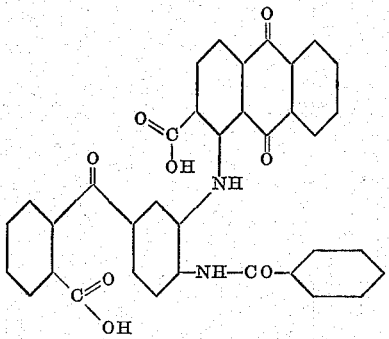

*Example 23*

5 parts of the product from Example 22 are dissolved in 50 parts sulphuric acid monohydrate and the solution warmed to 150° C. for 15 minutes. After cooling the solution is poured on to ice, filtered, the cake washed free of acid, and extracted with dilute alkali and again filtered.

The product which is substantially 3-aminodiphthalylacridone dyes cotton in bluish grey shades from a dark red vat. The product may be benzoylated when an exceedingly fast dyestuff is obtained. The product has the probable formula:

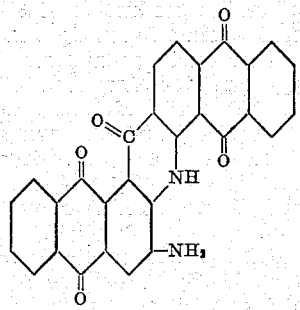

We claim:—

Compounds of the class consisting of 4-methylamino-1, 2, 5, 6-diphthaloylacridone; 4-anilido-1, 2, 5, 6-diphthaloylacridone; 4-anthraquinonylamino-1, 2, 5, 6-diphthaloylacridone; bis-4, 4' (1, 2, 5, 6-diphthaloyl-acridonyl)-p-phenylenediamine; 4-hydroxy-1, 2, 5, 6-diphthaloylacridone; 4-phenoxy-1, 2, 5, 6-diphthaloylacridone; 4-mercapto-1, 2, 5, 6-diphthaloylacridone.

WILLIAM SMITH.
JAMES PRIMROSE.
J. THOMAS.